(12) United States Patent
Brumels

(10) Patent No.: US 7,988,320 B2
(45) Date of Patent: Aug. 2, 2011

(54) LIGHTING DEVICE HAVING ADJUSTABLE SOLAR PANEL BRACKET

(75) Inventor: Craig W. Brumels, Holland, MI (US)

(73) Assignee: Intense Solar, LLC, St. Joseph, MI (US)

( * ) Notice: Subject to any disclaimer, the term of this patent is extended or adjusted under 35 U.S.C. 154(b) by 0 days.

(21) Appl. No.: 12/690,337

(22) Filed: Jan. 20, 2010

(65) Prior Publication Data

US 2010/0219762 A1    Sep. 2, 2010

Related U.S. Application Data

(60) Provisional application No. 61/174,619, filed on May 1, 2009, provisional application No. 61/182,501, filed on May 29, 2009.

(51) Int. Cl.
*F21L 4/04* (2006.01)
*F21L 4/08* (2006.01)

(52) U.S. Cl. ......... 362/192; 362/20; 362/145; 362/183; 362/191; 362/414; 248/299.1; 248/429

(58) Field of Classification Search ............ 362/20, 362/145, 153, 152, 183, 190, 191, 192, 414, 362/287; 248/291.01, 291.12, 297.21, 299.1, 248/687, 423, 429, 218.4–219.3
See application file for complete search history.

(56) References Cited

U.S. PATENT DOCUMENTS

| | | | | |
|---|---|---|---|---|
| 344,309 A * | 6/1886 | England | ..................... | 280/47.38 |
| 504,843 A * | 9/1893 | Light | .......................... | 248/299.1 |
| 585,518 A * | 6/1897 | Hamm et al. | ............... | 248/230.4 |
| 1,278,318 A * | 9/1918 | Edsall | ........................... | 248/515 |
| 1,338,781 A * | 5/1920 | Levy | ............................ | 248/299.1 |
| 1,636,185 A * | 7/1927 | Goodwin et al. | ............. | 248/245 |
| 1,789,124 A * | 1/1931 | Wever | ......................... | 248/298.1 |
| 2,037,435 A * | 4/1936 | Reichenbach | .............. | 174/70 R |
| 2,913,583 A * | 11/1959 | Regnier et al. | .............. | 250/203.4 |
| 2,919,353 A * | 12/1959 | Paradise | ........................ | 250/239 |
| 2,924,415 A * | 2/1960 | Elliott | ......................... | 248/205.1 |
| 2,926,874 A * | 3/1960 | Hahn | ............................ | 248/514 |
| 3,233,853 A * | 2/1966 | Majewski | ..................... | 248/74.4 |
| 3,317,809 A * | 5/1967 | Bowers et al. | ................ | 320/102 |
| 3,650,503 A * | 3/1972 | Seidel | ......................... | 248/285.1 |
| 3,836,954 A * | 9/1974 | Adam | ........................... | 362/310 |
| 4,009,535 A * | 3/1977 | Stock | .............................. | 40/546 |
| 4,055,374 A * | 10/1977 | Barber, Jr. | ........................ | 445/2 |
| 4,166,601 A * | 9/1979 | Kato | ........................... | 248/218.4 |
| 4,200,904 A * | 4/1980 | Doan | ............................ | 362/183 |
| 4,281,369 A * | 7/1981 | Batte | ............................ | 362/183 |
| 4,315,163 A * | 2/1982 | Bienville | ........................ | 307/66 |

(Continued)

FOREIGN PATENT DOCUMENTS

FR    2 592 461 A1    12/1985

*Primary Examiner* — Ismael Negron
(74) *Attorney, Agent, or Firm* — Prince Heneveld LLP

(57) ABSTRACT

A lighting device includes a support structure, a light source connected to the support structure, and an attachment bracket connected to the support structure. The lighting device further includes a support bracket moveably connected to the attachment bracket, wherein the support bracket has an arched shape, and a solar panel attached to the support bracket. The solar panel with respect to the solar radiation source is altered as a function of the moveable connection of the support bracket to the attachment bracket and the arched shape of the support bracket.

22 Claims, 14 Drawing Sheets

U.S. PATENT DOCUMENTS

| | | | |
|---|---|---|---|
| 4,318,019 A * | 3/1982 | Teasley et al. | 310/156.35 |
| 4,319,310 A * | 3/1982 | Kingsley | 362/183 |
| 4,343,032 A * | 8/1982 | Schwartz | 362/276 |
| 4,551,793 A | 11/1985 | Mellema | |
| 4,928,914 A * | 5/1990 | Snodell | 248/284.1 |
| 4,937,718 A | 6/1990 | Murray | |
| D309,789 S | 8/1990 | Luce | |
| D311,722 S | 10/1990 | Cheng | |
| 4,977,488 A * | 12/1990 | Spotts et al. | 362/183 |
| 4,995,377 A | 2/1991 | Eiden | |
| 5,039,903 A * | 8/1991 | Farrall | 313/160 |
| 5,136,493 A | 8/1992 | Straus et al. | |
| 5,149,188 A * | 9/1992 | Robbins | 362/183 |
| 5,161,874 A | 11/1992 | Benes | |
| 5,211,470 A | 5/1993 | Frost et al. | |
| 5,217,296 A | 6/1993 | Tanner et al. | |
| 5,266,738 A | 11/1993 | MacVoy | |
| 5,576,533 A * | 11/1996 | Tantraporn | 250/214 R |
| D404,842 S | 1/1999 | Hurst | |
| 5,931,423 A * | 8/1999 | Heideloff | 248/74.4 |
| 6,046,400 A * | 4/2000 | Drummer | 136/244 |
| 6,058,930 A | 5/2000 | Shingleton | |
| 6,060,658 A | 5/2000 | Yoshida et al. | |
| D469,399 S | 1/2003 | Shugar | |
| 6,661,113 B1 * | 12/2003 | Bonin | 290/55 |
| 6,784,357 B1 | 8/2004 | Wang | |
| 6,942,361 B1 * | 9/2005 | Kishimura et al. | 362/240 |
| 6,960,717 B2 | 11/2005 | Stuart et al. | |
| D517,233 S | 3/2006 | Doppelt | |
| D543,500 S | 5/2007 | Parness et al. | |
| 7,241,023 B1 * | 7/2007 | Carpenter | 362/183 |
| D564,691 S | 3/2008 | Ertze Encinas et al. | |
| D573,742 S | 7/2008 | Bears | |
| 7,430,120 B2 * | 9/2008 | Lau | 361/709 |
| 7,431,391 B2 * | 10/2008 | Hsiao | 297/215.15 |
| D598,157 S * | 8/2009 | Zhou et al. | D26/69 |
| 7,784,981 B2 * | 8/2010 | Xiao et al. | 362/431 |
| 7,824,191 B1 * | 11/2010 | Browder | 439/76.1 |
| 7,827,714 B2 * | 11/2010 | Howard et al. | 362/367 |
| 2003/0051476 A1 * | 3/2003 | Reno | 60/641.8 |
| 2005/0006958 A1 * | 1/2005 | Dubovsky | 307/64 |
| 2005/0068765 A1 | 3/2005 | Ertze Encinas et al. | |
| 2005/0174762 A1 | 8/2005 | Fogerlie | |
| 2007/0002561 A1 | 1/2007 | Tesmer et al. | |
| 2007/0107298 A1 * | 5/2007 | Miao et al. | 43/113 |
| 2007/0159836 A1 | 7/2007 | Huang et al. | |
| 2007/0194196 A1 * | 8/2007 | Pfister et al. | 248/299.1 |
| 2007/0236187 A1 * | 10/2007 | Wai et al. | 323/222 |
| 2008/0094818 A1 | 4/2008 | Harris | |
| 2008/0137327 A1 * | 6/2008 | Hodulik | 362/183 |
| 2008/0247155 A1 | 10/2008 | Allsop et al. | |
| 2008/0298051 A1 | 12/2008 | Chu | |
| 2009/0040750 A1 | 2/2009 | Myer | |
| 2010/0220467 A1 * | 9/2010 | Daidone et al. | 362/183 |

* cited by examiner

LIGHTING DEVICE HAVING ADJUSTABLE SOLAR PANEL BRACKET

CROSS-REFERENCE TO RELATED APPLICATIONS

This application claims priority under 35 U.S.C. §119(e) to U.S. Provisional Patent Application No. 61/174,619 filed on May 1, 2009, by Craig W. Brumels and U.S. Provisional Patent Application No. 61/182,501 filed on May 29, 2009, by Craig W. Brumels, the entire disclosures of which are hereby incorporated herein by reference.

FIELD OF THE INVENTION

The present invention generally relates to a lighting system and device and methods thereof, and more particularly, a solar lighting system and device and methods thereof.

BACKGROUND OF THE INVENTION

Generally, light sources draw electrical power from a power grid, wherein non-renewable resources provide the majority of the electrical power supplied by the power grid. However, electrical power can be harnessed from renewable resources, such as solar, wind, or water. Typically, it is difficult to efficiently manufacture devices or systems capable of harnessing energy from these renewable resources and storing and supplying the electrical power efficiently, when compared to devices or systems that generate electrical power from non-renewable resources.

SUMMARY OF THE INVENTION

According to one aspect of the present invention, a lighting device configured to receive solar radiation from a solar radiation source includes a support structure, a light source connected to the support structure, and an attachment bracket connected to the support structure. The lighting device further includes a support bracket moveably connected to the attachment bracket, wherein the support bracket has an arched shape and a solar panel attached to the support bracket, wherein an angle of the solar panel with respect to the solar radiation source is altered as a function of the moveable connection of the support bracket to the attachment bracket and the arched shape of the support bracket.

According to another aspect of the present invention, a solar powered lighting device configured to receive solar radiation from a solar radiation source includes a support structure, a light source connected to the support structure, wherein the light source is an inductive light source, and an energy storage device in electrical communication with the light source, wherein the energy storage device is configured to store electrical power and supply the electrical power to the light source. The solar powered lighting device further includes a photo-sensor configured to detect ambient light, such that the light source emits light when the detected ambient light is below a threshold value, an attachment bracket connected to the support structure, a support bracket moveably connected to the attachment bracket, wherein the support bracket has an arched shape, and a solar panel attached to the support bracket, wherein an angle of the solar panel with respect to the solar radiation source is altered as a function of the moveable connection of the support bracket to the attachment bracket and the arched shape of the support bracket.

According to yet another aspect of the present invention, a lighting device system configured to receive solar radiation from a solar radiation source includes a power grid and at least one lighting device in electrical communication with the power grid. The at least one lighting device includes a support structure, a light source connected to the support structure, a solar panel attached to the support structure, wherein the solar panel is adapted to receive the solar radiation from the solar radiation source, a support bracket moveably connected to the attachment bracket, wherein the support bracket has an arched shape, and the solar panel is attached to the support structure via the attachment bracket and the support bracket, such that an angle of the solar panel with respect to the solar radiation source is altered as a function of the moveable connection of the support bracket to the attachment bracket and the arched shape of the support bracket, and an invertor in electrical communication with the light source and the solar panel, wherein the invertor is configured to control a supply of the electrical power from the solar panel to one of the light source and the power grid.

These and other features, advantages and objects of the present invention will be further understood and appreciated by those skilled in the art by reference to the following specification, claims and appended drawings.

DETAILED DESCRIPTION

Figures 1A, 1B:
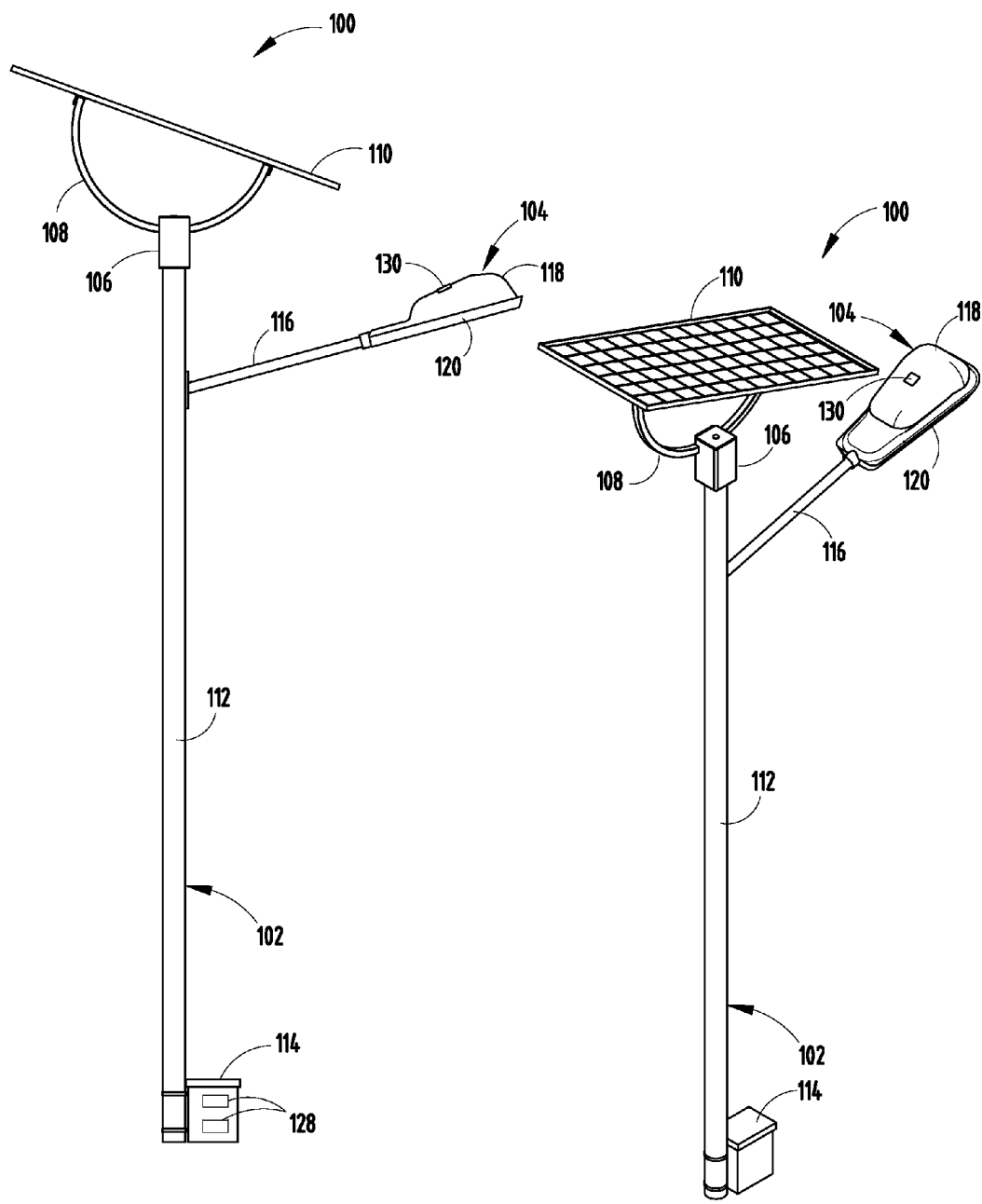
FIG. 1A is side plan view of a lighting device, in accordance with one embodiment of the present invention.
FIG. 1B is rear-side perspective view of a lighting device, in accordance with one embodiment of the present invention.
Figure 1C:
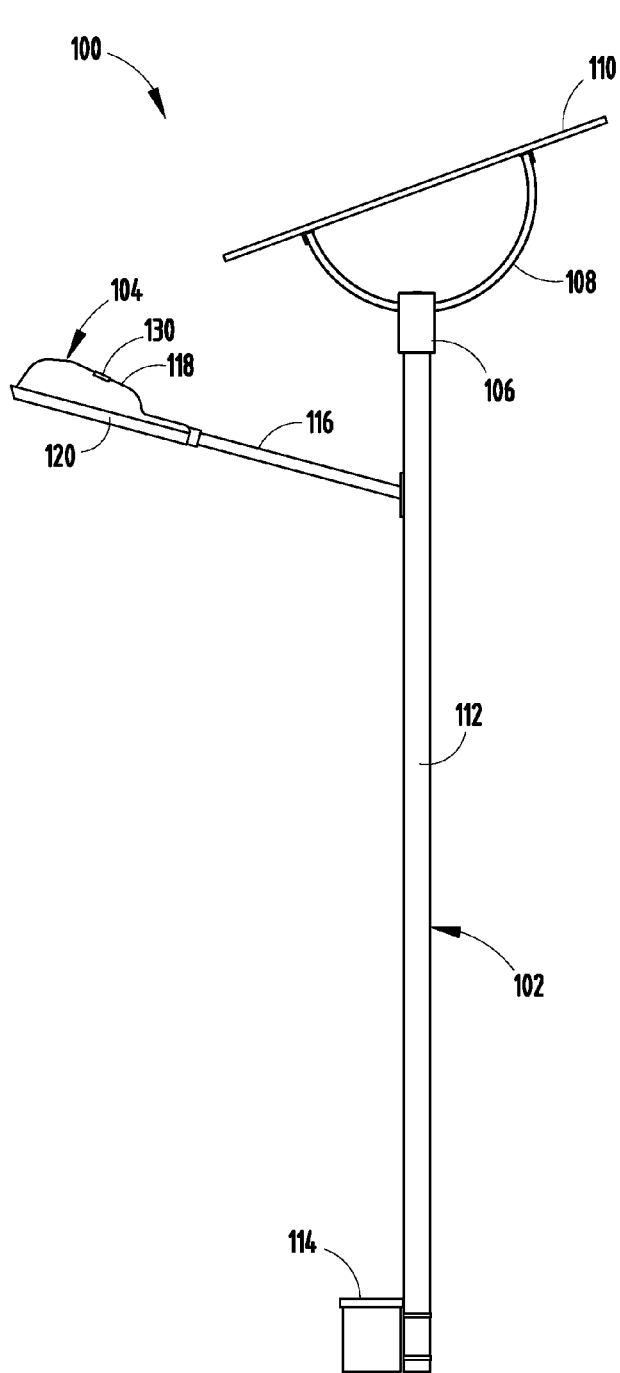
FIG. 1C is a side plan view of a lighting device, in accordance with one embodiment of the present invention.
Figure 1D:
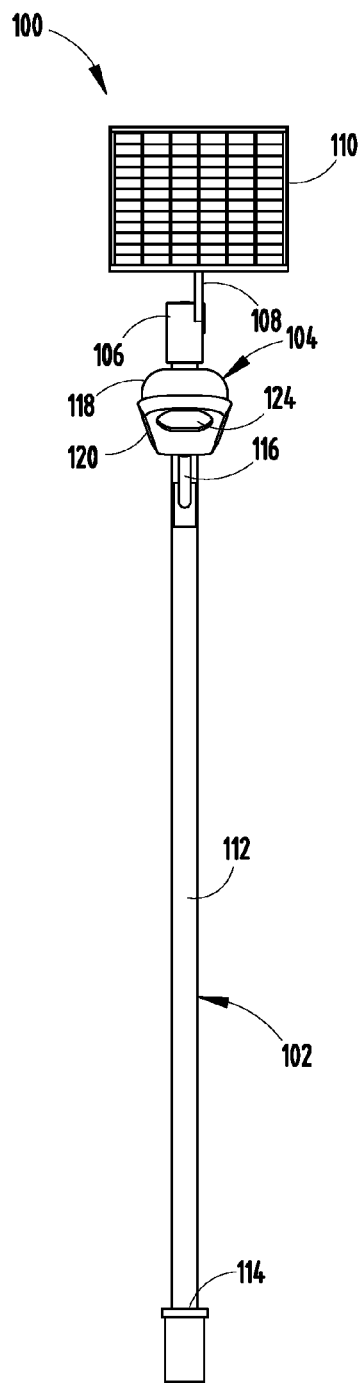
FIG. 1D is a rear plan view of a lighting device, in accordance with one embodiment of the present invention.

Before describing in detail embodiments that are in accordance with the present invention, it should be observed that the embodiments reside primarily in a lighting system and device and methods thereof. Accordingly, the system and device and methods thereof have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as first and second, top and bottom, and the like, may be used to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In regards to FIGS. 1A-14, a lighting device is generally shown at reference identifier 100 (FIGS. 1A-1D). The lighting device 100 can include a support structure, generally indicated at reference identifier 102 (FIGS. 1A-1D), and a light source, generally indicated at reference identifier 104 (FIGS. 1A-1D and 2), wherein the light source 104 can be connected to the support structure 102. An attachment bracket 106 (FIGS. 1A-1D, 3-8, and 12-14) can be connected to the support structure 102, and a support bracket 108 can be moveably connected to the attachment bracket 106, wherein the support bracket 108 has an arched shape. Further, a solar panel 110 (FIGS. 1A-1D) can be attached to the support bracket 108, wherein an angle of the solar panel 110 with respect to a solar radiation source is altered as a function of the moveable connection of the support bracket 108 to the attachment bracket 106 and the arched shape of the support bracket 108, as described in greater detail herein.

Thus, the lighting device 100 can be used as a solar street light, such that the lighting device 100 can be placed substantially stationary in the ground, and the support bracket 108 can be moveably altered with respect to the attachment bracket 106 so that the solar panel 110 is at substantially an optimal position with respect to a solar radiation source, such as the sun. Therefore, multiple street lighting devices 100 can be manufactured having the same design, while the positioning of the solar panel 110 of the lighting device 100 can be individually optimized to the specific location that the lighting device 100 is constructed. It should be appreciated by those skilled in the art that any dimensions provided herein are for exemplary purposes, and that the lighting device 100 is not limited to these dimensions. Alternatively, the lighting device 100 can be used for other applications, wherein the lighting device 100 is subjected to a solar radiation source, such as, but not limited to, the lighting device 100 used on billboards, exit signs, or the like.

According to one embodiment, the light source 104 can be an inductive light source. By way of explanation and not limitation, the inductive light source 104 can be an OSRAM™ light bulb. Additionally or alternatively, the support structure 102 can include an elongated member 112 that extends vertically from a base portion 114 with respect to a normal operating position of the lighting device 100, and an arm 116 extending from the elongated member 112, wherein the light source 104 is connected to the arm 116. The elongated member 112 can have a circular circumference, a square or rectangular perimeter, other suitable shape, or a combination thereof. The arm 116 can be connected to the elongated member 112 at the point where the attachment bracket 106 is connected to the elongated member 112, or at another position along the elongated member 112 where the attachment bracket 106 does not connect to the elongated member 112. Typically, the arm 116 extends outwards from the elongated member 112 so that the light source 104 extends over an area to be illuminated. Additionally, the arm 116 can extend from the elongated member 112 at an angle to obtain a desirable illumination area, as described in greater detail herein.

The attachment bracket 106, elongated member 112, base portion 114, or a combination thereof, can be a single integrated structure that forms a portion of the support structure 102. Alternatively, at least a portion of these components can be separate components that are mechanically connected, such as, but not limited to, a nut and bolt connection, connected via a welded connection, connected via another suitable type of connection, or a combination thereof, to form a portion of the support structure 102. According to one embodiment, a cover plate 107 is connected to the attachment bracket 106 (FIGS. 3, 8, 9, and 12-14). Alternatively, the cover plate 107 can be integrated with the attachment bracket 106. The cover plate 107 can be used to secure the support bracket 108 in a groove or cavity 109 of the attachment bracket 106, wherein the groove 109 can be defined by one or more surfaces of the attachment bracket 106. Typically, the groove 109 has a shape substantially similar to the arched shape of the support bracket 108, such that the support bracket 108 is moveably connected to the attachment bracket 106, but is adequately connected (e.g., substantially not moveable) when the cover plate 107 is substantially completely connected to the attachment bracket 106. Thus, the connection between the cover plate 107 and the attachment bracket 106 can be loosened to move the support bracket along the groove 109 to adequately position the solar panel 110, and the connection between the attachment bracket 106 and the cover plate 107 can then be tightened to adequately secure the support bracket 108.

Typically, the elongated member 112 is a tubular elongated member made of a steel material. Similarly, the attachment bracket 106, the support bracket 108, the arm 116, or a combination thereof, can be made of a steel material. According to one embodiment, the support bracket 108 is three-sixteenth inch (3/16 in) steel. By having the attachment bracket 106, the support bracket 108, the elongated member 112, and the arm 116 in such a configuration and/or made of such materials, the lighting device 100 can withstand winds up to approximately one hundred twenty five miles per hour (125 mph). It should be appreciated by those skilled in the art that other suitable materials can be used.

According to one embodiment, the attachment bracket 106 can be configured, such that the support bracket 108 can move along multiple axis (e.g., a multiple axis swivel) with respect to the attachment bracket 106. In such an embodiment, the solar panel 110 can be adjusted to face a directional heading (e.g., a southerly heading when the lighting device 100 is used in the United States), and adjusted with respect to a latitude to increase the amount of solar radiation received by the solar panel 110.

Figure 2:
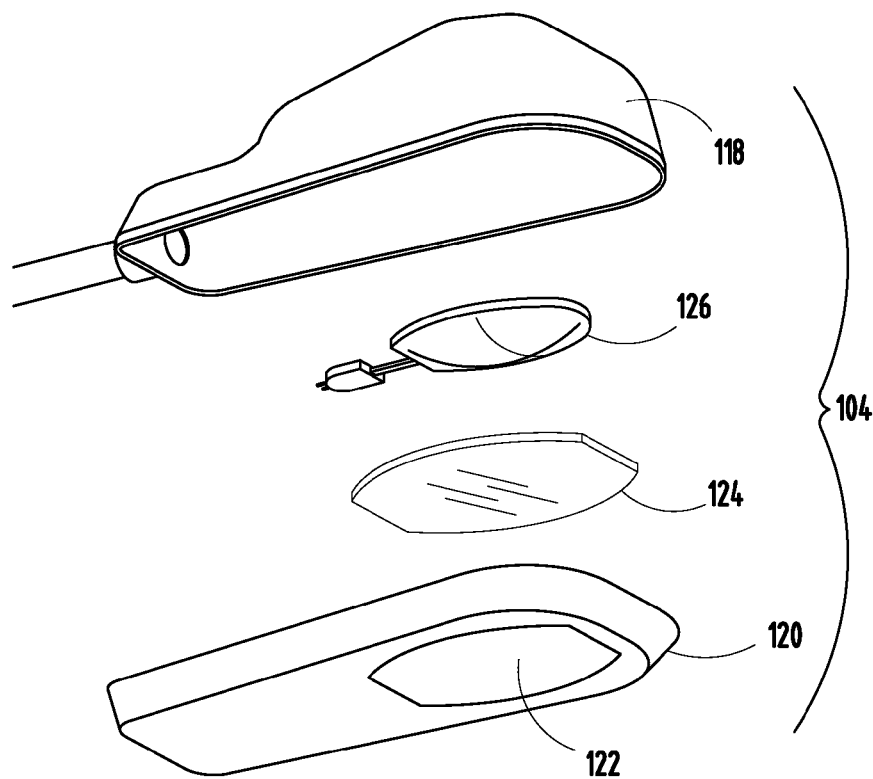
FIG. 2 is an exploded view of a light source of a lighting device, in accordance with one embodiment of the present invention.
Figure 3:
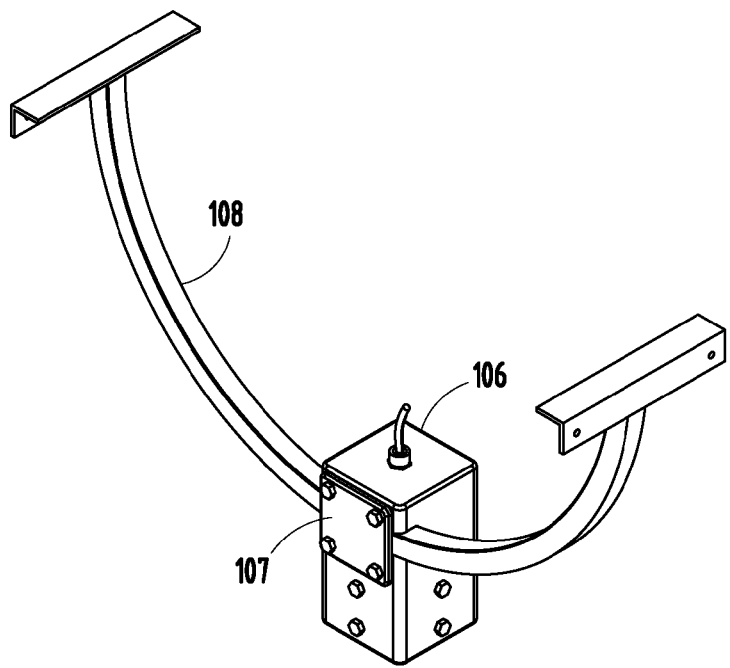
FIG. 3 is a perspective view of an attachment bracket and a support bracket of a lighting device, in accordance with one embodiment of the present invention.
Figure 4:
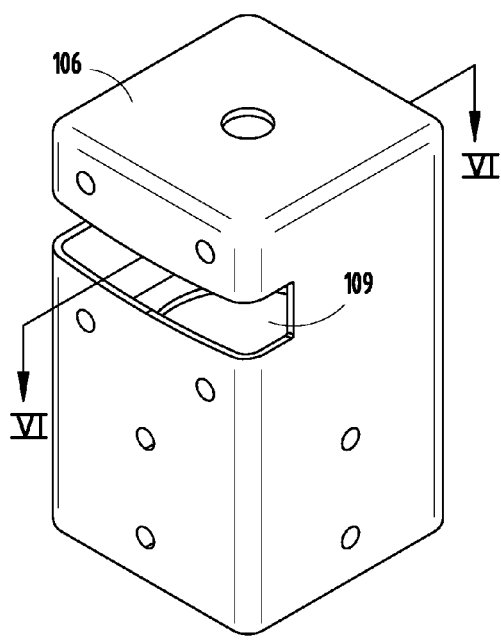
FIG. 4 is a front-side perspective view of an attachment bracket of a lighting device, in accordance with one embodiment of the present invention.
Figure 6:
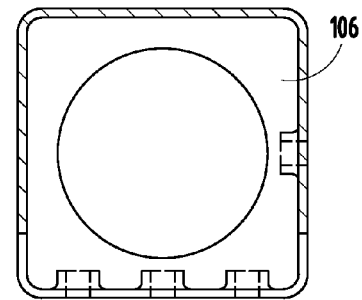
FIG. 6 is a bottom plan view of an attachment bracket of a lighting device, in accordance with one embodiment of the present invention.
Figure 7:
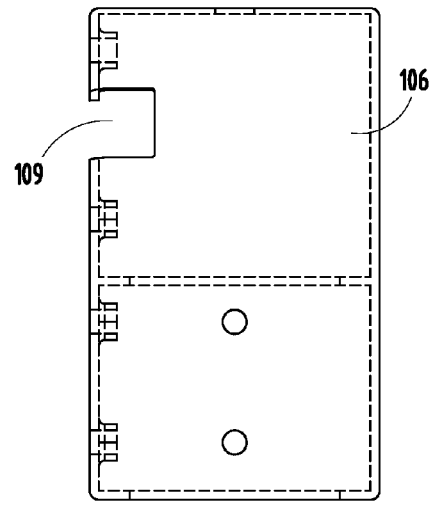
FIG. 7 is a side plan view of an attachment bracket of a lighting device, in accordance with one embodiment of the present invention.
Figure 5:
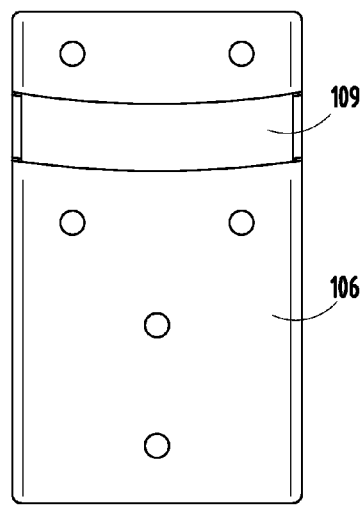
FIG. 5 is a front plan view of an attachment bracket of a lighting device, in accordance with one embodiment of the present invention.
Figure 8:
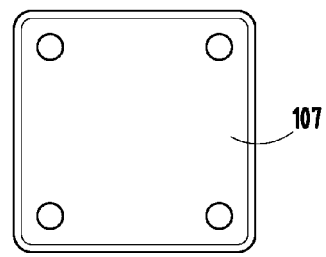
FIG. 8 is a front plan view of a cover plate of an attachment bracket of a lighting device, in accordance with one embodiment of the present invention.
Figure 9:
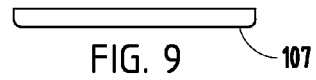
FIG. 9 is a side plan view of a cove plate of an attachment bracket of a lighting device, in accordance with one embodiment of the present invention.
Figure 10:
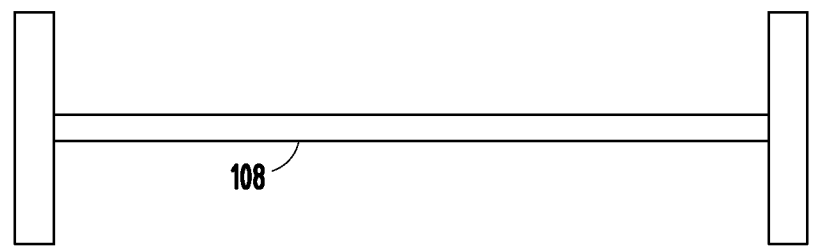
FIG. 10 is a top plan view of a support bracket of a lighting device, in accordance with one embodiment of the present invention.
Figure 11:
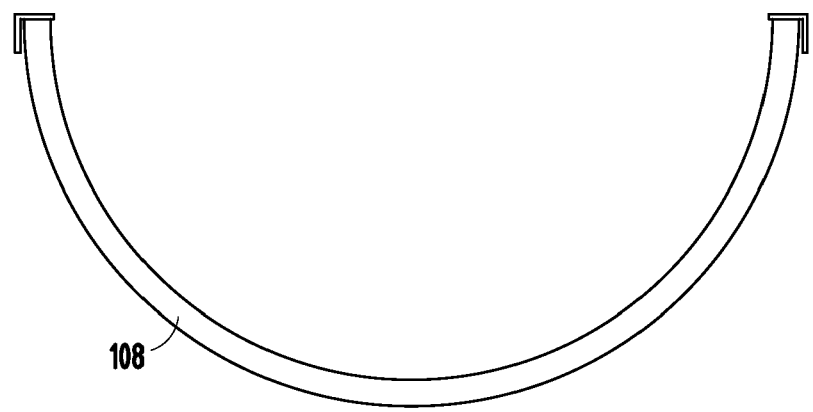
FIG. 11 is a front plan view of a support bracket of a lighting device, in accordance with one embodiment of the present invention.
Figure 12:
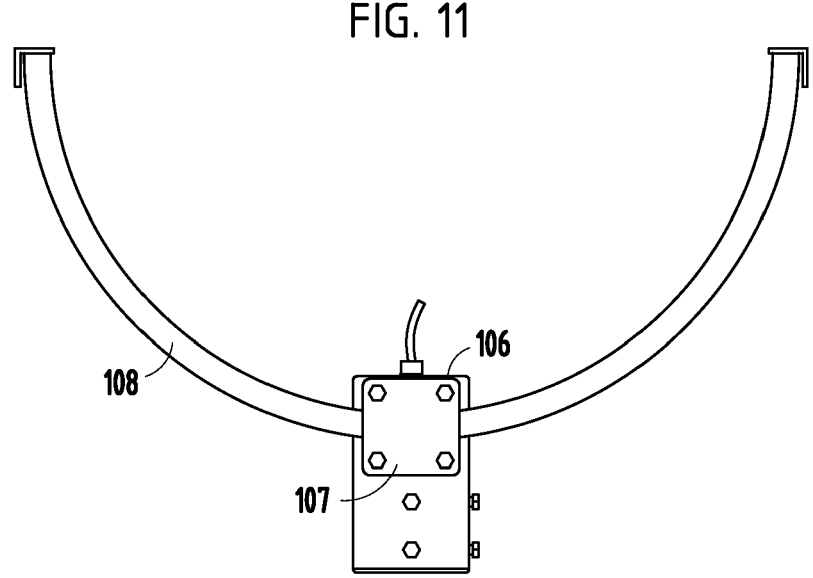
FIG. 12 is a front plan view of an attachment bracket and a support bracket of a lighting device, in accordance with one embodiment of the present invention.
Figure 13:
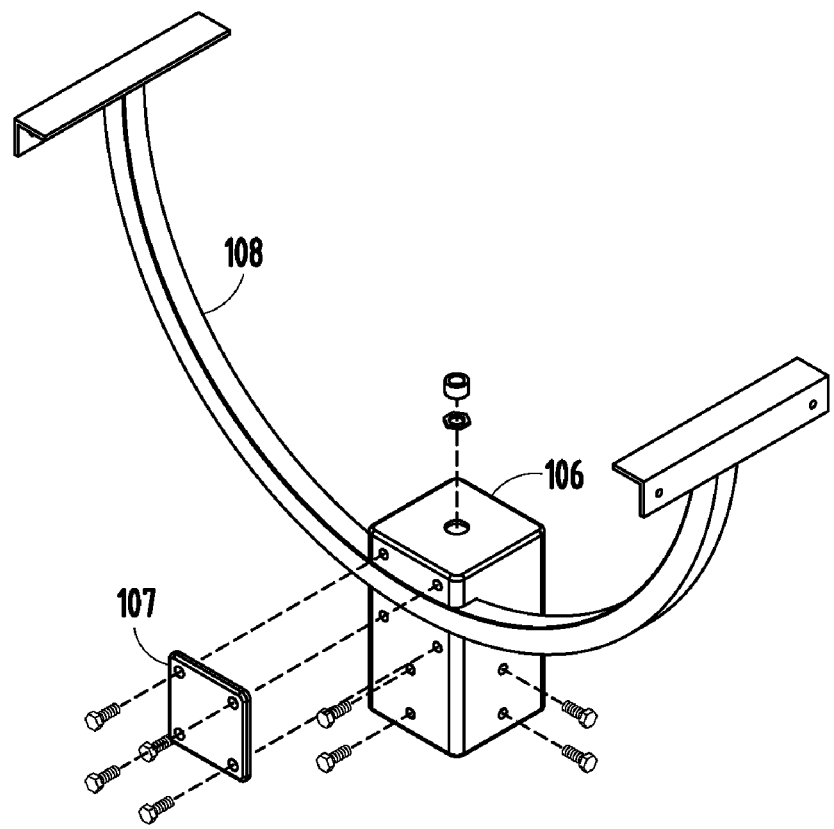
FIG. 13 is an exploded, front-side perspective view of an attachment bracket and a support bracket of a lighting device, in accordance with one embodiment of the present invention.
Figure 14:
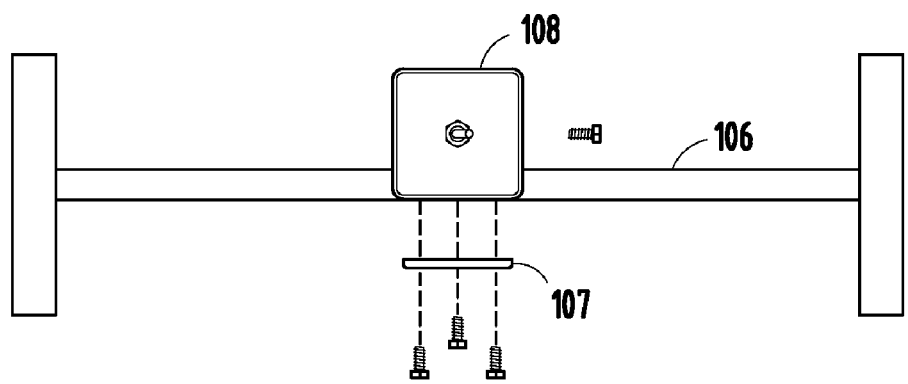
FIG. 14 is an exploded, top plan view of an attachment bracket and a support bracket of a lighting device, in accordance with one embodiment of the present invention.

With respect to FIG. 2, the light source 104 includes a top housing 118, and a bottom housing 120 configured to connect to the top housing 118, wherein the bottom housing 120 defines an aperture 122, according to one embodiment. The light source 104 can further include a substantially transparent substrate 124 attached to the bottom housing 120, wherein the substantially transparent substrate 124 occupies at least a portion of the aperture 122. The light source 104 can also include a light element 126 substantially enclosed in the top housing 118 and bottom housing 120, wherein light emitted from the light element 126 propagates through the substantially transparent substrate 124. It should be appreciated by those skilled in the art that the light element 126 can be one or more light elements or an array of light elements.

Typically, at least one energy storage device 128 (FIGS. 1A and 18) is in electrical communication with the solar panel 110 and the light source 104. The energy storage device 128 can be configured to store electrical power supplied from the solar panel 110, and the energy storage device 128 can then supply the stored electrical power to the light source 104. By way of explanation and not limitation, the solar panel 110 is a photovoltaic solar panel, such that the solar radiation received by the solar panel is converted to electrical power and supplied to the energy storage device 128. According to one embodiment, the solar panel 110 can be a SHARP™ solar panel or SOLAR WORLD™ solar panel.

Typically, at least one energy storage device 128 is stored in a base portion 114 of the support structure 102. The energy storage device 128 can be stored in the base portion 114 or additional housing connected to the base portion 114, in order for the energy storage device 128 to be more accessible for maintenance, as compared to an embodiment where the energy storage device is located closer to the light source 104 or the solar panel 110. However, it should be appreciated by those skilled in the art that the energy storage device 128 can be stored anywhere within or near the lighting device 100, so long as the energy storage device 128 is in electrical communication with the light source 104 and the solar panel 110. According to one embodiment, the energy storage device 128 is an EAST PENN MANUFACTURING CO. DEKRA™ gel cell battery. It should be appreciated by those skilled in the art that other suitable chemical compositions can be used in the energy storage device 128.

Figure 15A:
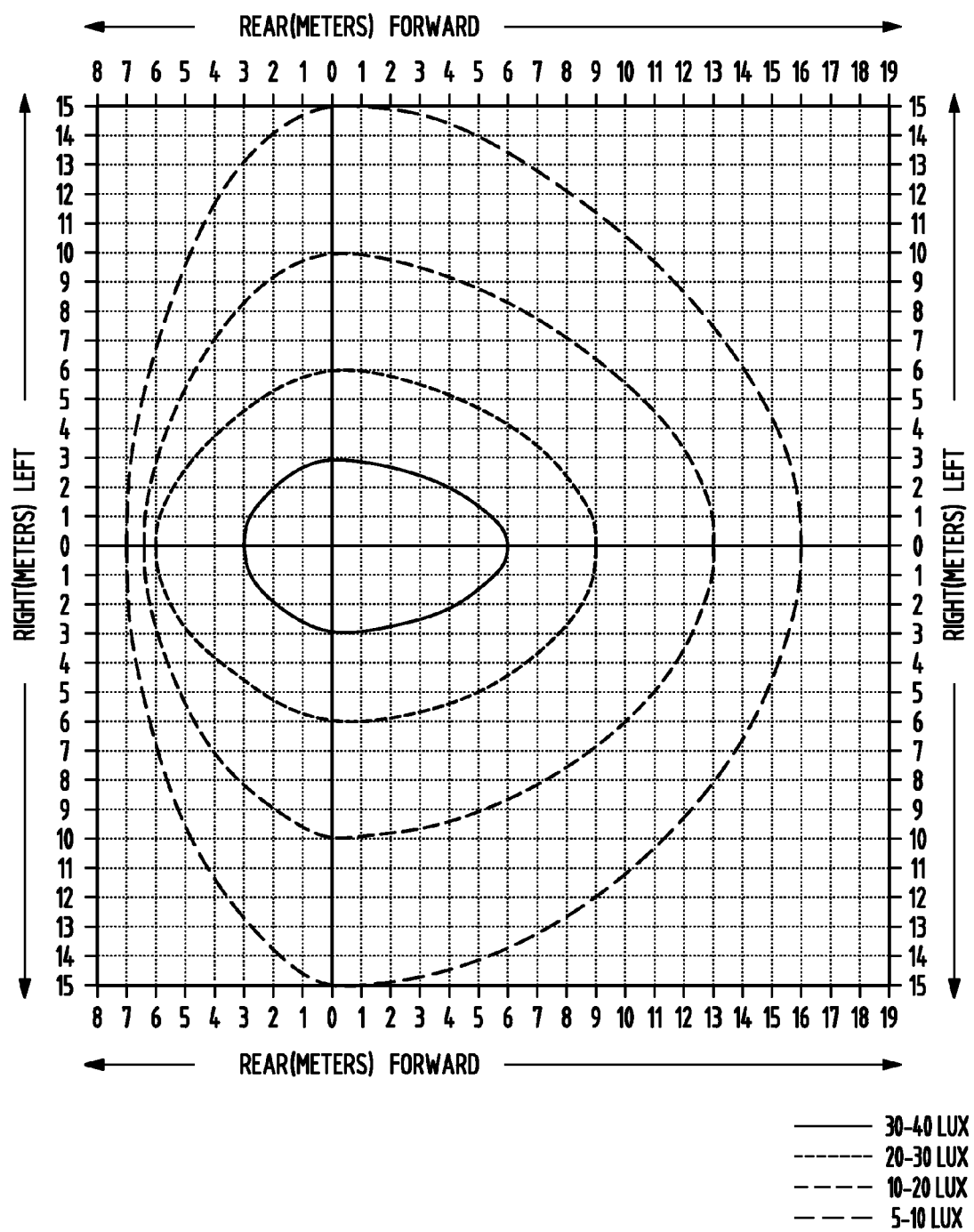
FIG. 15A is a chart illustrating an exemplary illumination pattern of a light source including an induction light bulb of a lighting device, in accordance with one embodiment of the present invention.
Figure 15B:
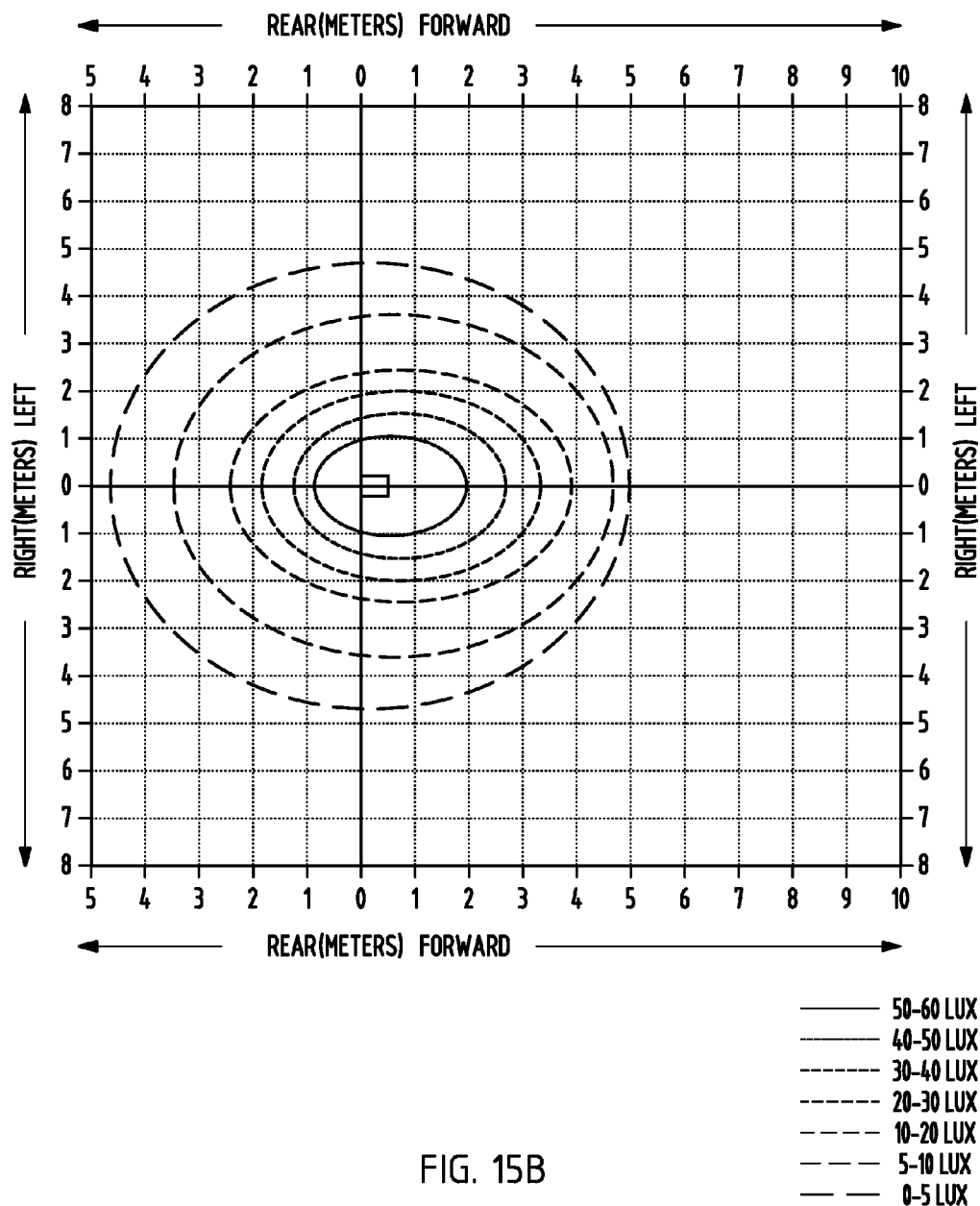
FIG. 15B is a chart illustrating an exemplary illumination pattern of a light emitting diode (LED) light source.
Figure 15C:
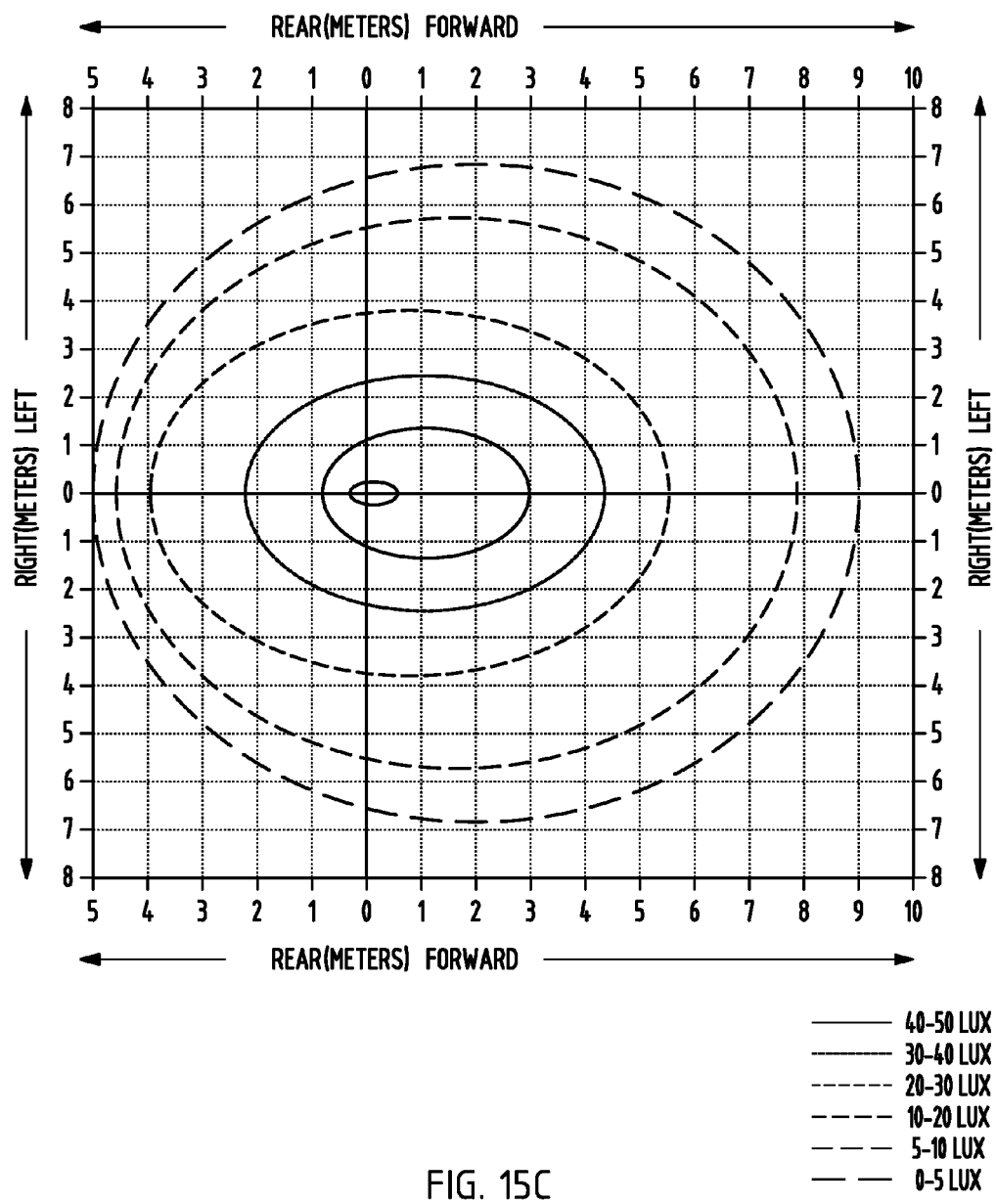
FIG. 15C is a chart illustrating another exemplary illumination pattern of a LED light source.
Figure 15D:
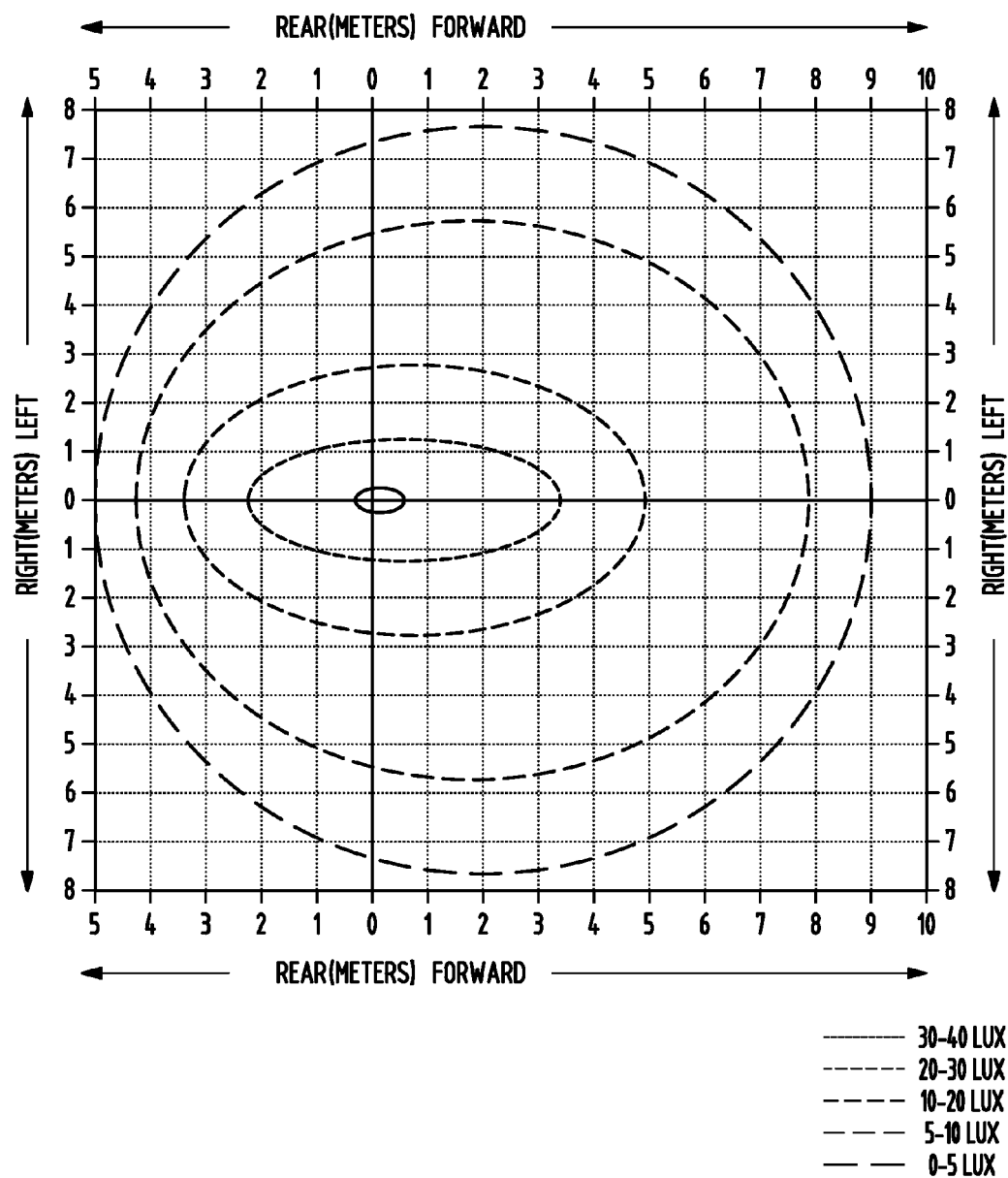
FIG. 15D is a chart illustrating yet another exemplary illumination pattern of a LED light source.

An illumination pattern of light emitted from the light source 104 can be a function of the light element 126, the aperture 122, the substantially transparent substrate 124, a suitable filter, the like, or a combination thereof, according to one embodiment. An exemplary illumination pattern is illustrated in FIG. 15A. Typically, when the light element 126 is an induction bulb, a greater illumination area and efficiency is obtained (FIG. 15A), when compared to a light element that is a light emitting diode (LED) (FIGS. 15B-15D) or an incandescent bulb.

As illustrated in an exemplary illumination pattern of FIG. 15A, a first or center portion of the illumination pattern can have an elliptical shape with one diameter of approximately six meters (6 m) and a second diameter of approximately nine meters (9 m), wherein an intensity of the light emitted from the light source 104 is approximately thirty to forty lux (30-40 lux). A second portion of the illumination pattern can have an elliptical shape surrounding the first portion with a first outer diameter of approximately fifteen meters (15 m) and a second outer diameter of approximately twelve meters (12 m), wherein an intensity of the light emitted from the light source 104 is approximately twenty to thirty lux (20-30 lux). A third portion of the illumination pattern can have a lopsided elliptical shape surrounding the second portion with a first outer diameter of approximately nineteen and one-half meters (19.5 m) and a second outer diameter of approximately twenty meters (20 m), wherein an intensity of the light emitted from the light source 104 is approximately ten to twenty lux (10-20 lux). A forth portion of the illumination pattern can have a lopsided elliptical shape surrounding the third portion with a first outer diameter of approximately twenty three meters (23 m) and a second outer diameter of approximately thirty meters (30 m), wherein an intensity of the light emitted from the light source 104 is approximately five to ten lux (5-10 lux).

The illumination pattern can be altered by the type of light source 104, the design of the light source (e.g., the shape of the aperture 122, a filter, etc.), the angle of the arm 116 extending from the elongated member 112, the amount of electrical power supplied to the light source 104 from the energy storage device 128, which can be controlled by hardware circuitry and/or one or more executable software routines, a state of charge of the energy storage device 128, the like, or a combination thereof. According to one embodiment, the intensity of the light source 104 can be controlled (e.g., by the amount of electrical power supplied from the energy storage device 128 to the light source 104) based upon the amount of ambient light received by the solar panel 110 or a photo-sensor 130. In such an embodiment, the intensity of the light emitted by the light source 104 can be greater in the early evening hours (i.e., dusk) and early morning hours (i.e., dawn) when there is ambient light interfering with the light emitted from the light source 104. Further, the intensity of the light source 104 can be reduced at other times when ambient light interference is minimal to conserve electrical power. Thus, a smaller energy storage device 128 can be used in the lighting device 100, as compared to an embodiment of the lighting device 100, wherein the intensity of the emitted light is not actively or dynamically controlled.

Figure 16:
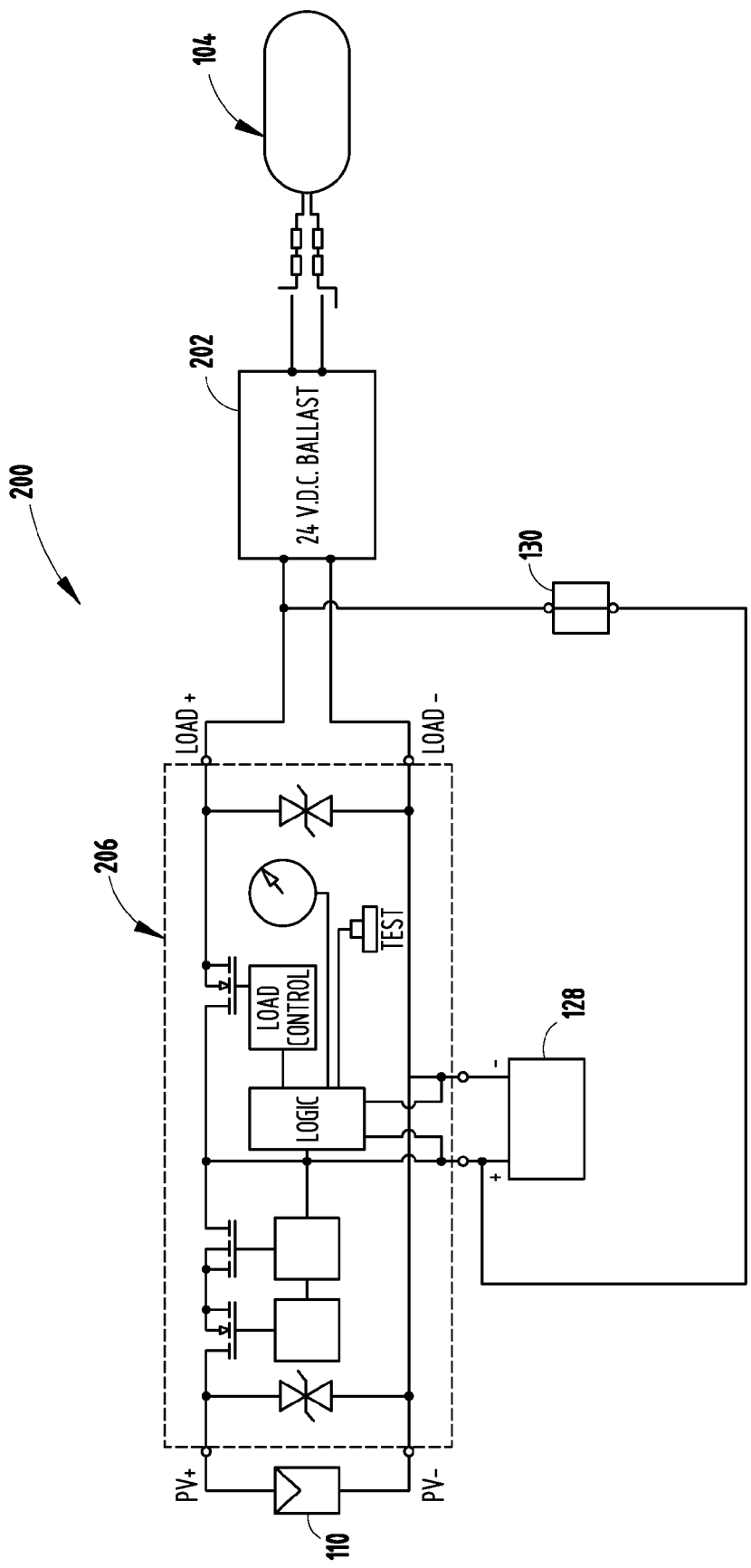
FIG. 16 is a schematic diagram of a circuit of a lighting device, in accordance with one embodiment of the present invention.

In regards to FIG. 16, a block diagram of an exemplary circuit used in lighting device 100 (FIGS. 1A-1D) is generally shown at reference identifier 200. The circuit 200 can include the solar panel 110, the light source 104, at least one energy storage device 128, a ballast 202, the photo-sensor 130, and a controller generally indicated at reference identifier 206. By way of explanation and not limitation, the controller 206 is a MORNING STAR™ controller. Further, any specifications as to electrical components set forth herein are for purposes of explanation and not limitation.

Typically, the light source 104, the solar panel 110, the energy storage device 128, and the ballast 202 are in electrical communication with one another. The controller 206 can control the supply of electrical power from the energy storage device 128 to the light source 104 and ballast 202. Generally, the ballast 202 can provide electrical power having a voltage potential of approximately three hundred volts (300 V) when the light source 104 is first turned on, and then reduces the supplied electrical power to a voltage potential of approximately twenty four volts (24 V). Further, the ballast 202 can supply the electrical power to the light source 104 at a frequency of approximately two hundred ten Hertz (210 Hz), which is typically provided without regard to the voltage potential of the supplied electrical power. According to one embodiment, the ballast 202 is at least partially enclosed between the top housing 118 and the bottom housing 120 of the light source 104.

The photo-sensor 130 can be used to monitor the ambient light, so that it can be determined when the energy storage device 128 is to supply electrical power to turn on the light source 104. Additionally, the photo-sensor 130 can be used to monitor the ambient light in order to alter the intensity of the light emitted by the light source 104. Additionally or alternatively, the controller 206 can be used to determine when the light source 104 is turned on and off by including a clock that monitors the predetermined time period between turning the light source 104 on and off (e.g., the predetermined time period between night and day hours during a twenty four (24) hour period).

Figure 17:
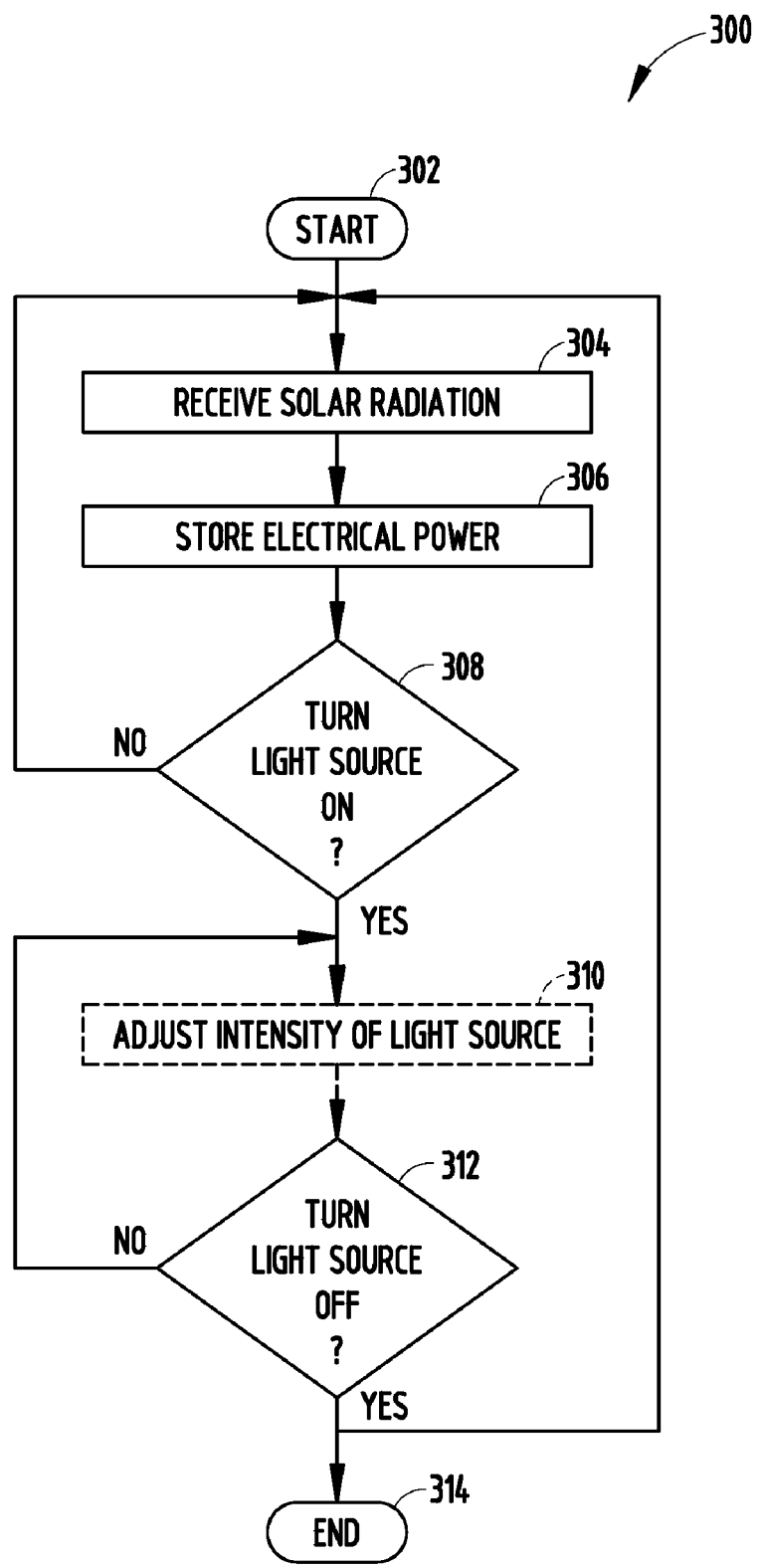
FIG. 17 is a flowchart illustrating a method of illumination a light source of a lighting device, in accordance with one embodiment of the present invention.

In regards to FIGS. 1-17, a method of controlling a lighting device 100 is generally shown in FIG. 17 at reference identifier 300. The method 300 starts at step 302, and proceeds to step 304, wherein solar radiation is received. Typically, the solar radiation is received by the solar panel 110, which converts the received solar radiation to electrical power. At step 306, electrical power is stored. Generally, the solar radiation converted to electrical power by the solar panel 110 is supplied to the energy storage device 128, which stores the electrical power.

At decision step 308, it is determined if the light source 104 is to be turned on. If it is determined at decision step 308 that the light source 104 is not to be turned on, then the method returns to step 304. If it is determined at decision step 308 that the light source 104 is to be turned on, then the method 300 proceeds to either step 310 (shown in phantom) or decision step 312. It should be appreciated by those skilled in the art, that if it is determined that the light source 104 is to be turned on at decision step 308, then the solar panel 110 can continue to receive solar radiation.

According to one embodiment, if it is determined to turn on the light source 104 at decision step 308, then the method 300 can proceed to step 310, wherein an intensity of the light source 104 is adjusted. As described above, the intensity of the light source 104 can be adjusted based upon the amount of ambient light interference, a state of charge of the energy storage device 128, the like, or a combination thereof. The method 300 can then proceed to decision step 312. According to an alternate embodiment, if it is determined at decision step 308 to turn on the light source 104, then the method 300 can proceed directly to decision step 312.

At decision step 312, it is determined if the light source 104 is to be turned off Typically, the light source 104 is turned off when there is an amount of ambient light that the light source 104 is no longer needed for illumination (e.g., during typical day time hours), which can be determined by the photo-sensor 130, the controller 206, a clock, the like, or a combination thereof. If it is determined at decision step 312 to not turn off the light source 104, then the method 300 can return to step 310 or decision step 312. However, if it is determined to turn the light source 104 off at decision step 312, then the method can return to step 304. The method 300 can then end at step 314.

Figure 18:
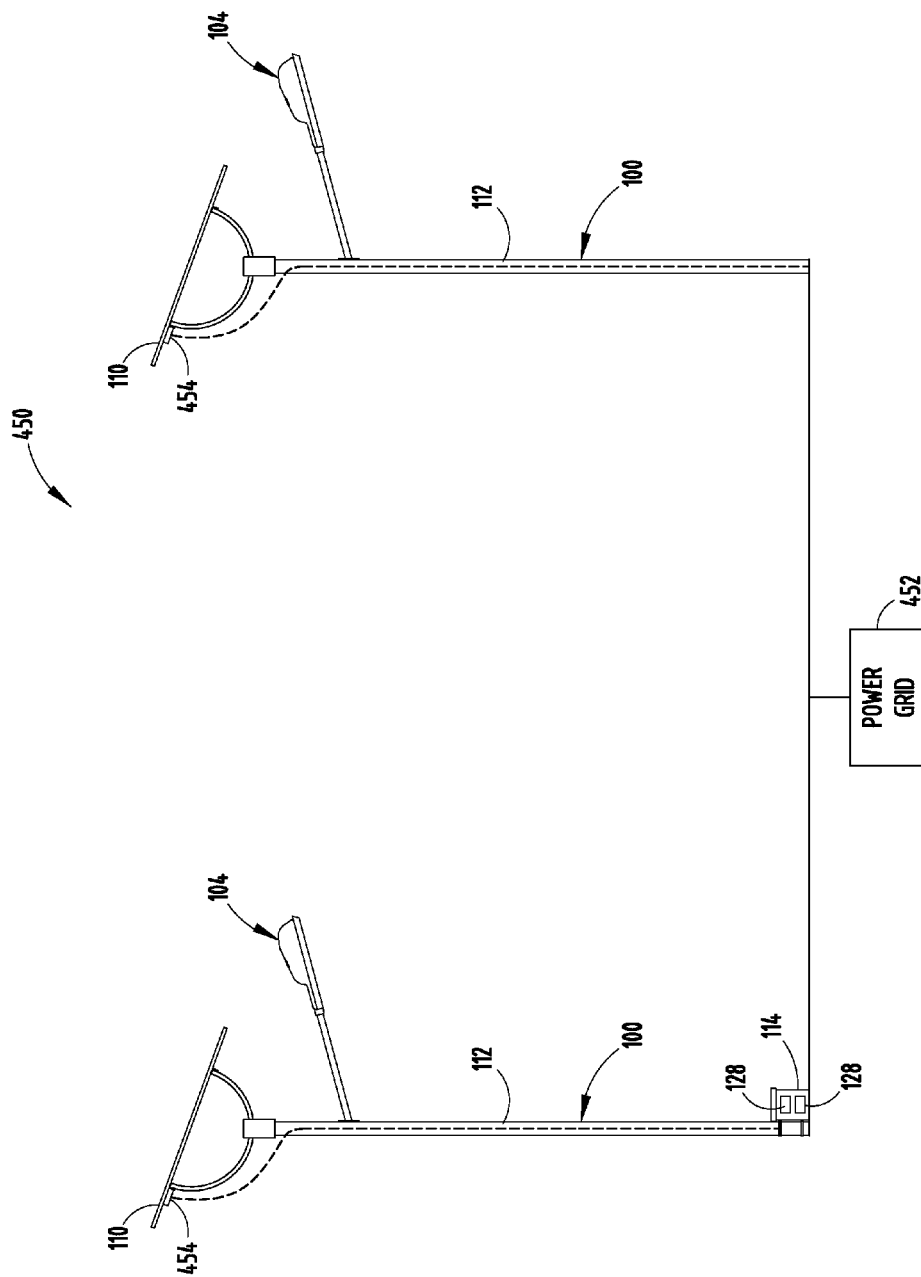
FIG. 18 is a schematic diagram of a solar lighting device system, in accordance with one embodiment of the present invention.

With respect to FIG. 18, a lighting device system is generally shown at reference identifier 450. The lighting device system 450 includes at least one lighting device 100 in electrical communication with a power grid 452. It should be appreciated by those skilled in the art that the at least one lighting device 100 is illustrated in FIG. 18 as two lighting devices 100, but that any number of lighting devices 100 can be included in the lighting device system 450 and in electrical communication with the power grid 452. It should further be appreciated by those skilled in the art that the power grid 452 can be in electrical communication with other components, devices, systems, or the like that draw electrical power from the power grid 452, supply electrical power to the power grid 452, or a combination thereof. In such an embodiment as illustrated in FIG. 18, the lighting device 100 can include an invertor 454 for controlling the supply of electrical power to and from the power grid 452. By way of explanation and not limitation, the invertor 454 can be a micro-inverter having a three phase (3Φ) forty volts direct current (40 VDC) input and a two hundred forty volts to two hundred eight volts alternating current (240-208 VAC) output.

For purposes of explanation and not limitation, in operation, the lighting device 100 of the lighting device system 450 receives solar radiation from a solar radiation source (e.g., the sun) via the solar panel 110, and the received solar radiation is converted to electrical power. According to one embodiment, at least of portion of the lighting devices 100 of the lighting device system 100 do not include an energy storage device, such that the invertor 454 controls the supply of electrical power to the power grid 452. When it is determined to illuminate the light source 104 (e.g., the ambient light is below a threshold value), then the lighting device 100 is supplied electrical power from the power grid 452 to illuminate the light source. Typically, for a period of time when the light source 104 is illuminated (e.g., nighttime hours), the lighting device 100 draws less than or equal to the amount of electrical power supplied to the power grid 452 during a previous period of time (e.g., the daytime hours). Thus, the lighting device system 450 can have an approximately zero carbon footprint.

According to an alternate embodiment, at least a portion of the lighting devices 100 of the lighting device system 450 include at least one energy storage device 128. In such an embodiment, the invertor 454 controls the supply of electrical power received and converted from the solar panel 110 to the energy storage device 128. When it is determined that the energy storage device 128 has an adequate state of charge, the invertor 454 can control the supply of electrical power to the power grid 452. The adequate state of charge can be a threshold value, such as, but not limited to, a substantially one hundred percent (100%) state of charge, a state of charge that is sufficient to illuminate the light source 104 for a period of time, or other adequate state of charge. Similar to an embodiment described above, typically, for a period of time when the light source 104 is illuminated (e.g., night time hours), the lighting device 100 draws from the power grid 452 less than or equal to the amount of electrical power supplied to the power grid 452 during a previous period of time (e.g., the day time hours). Thus, the lighting device system 450 can have an approximately zero carbon footprint.

Figure 19:
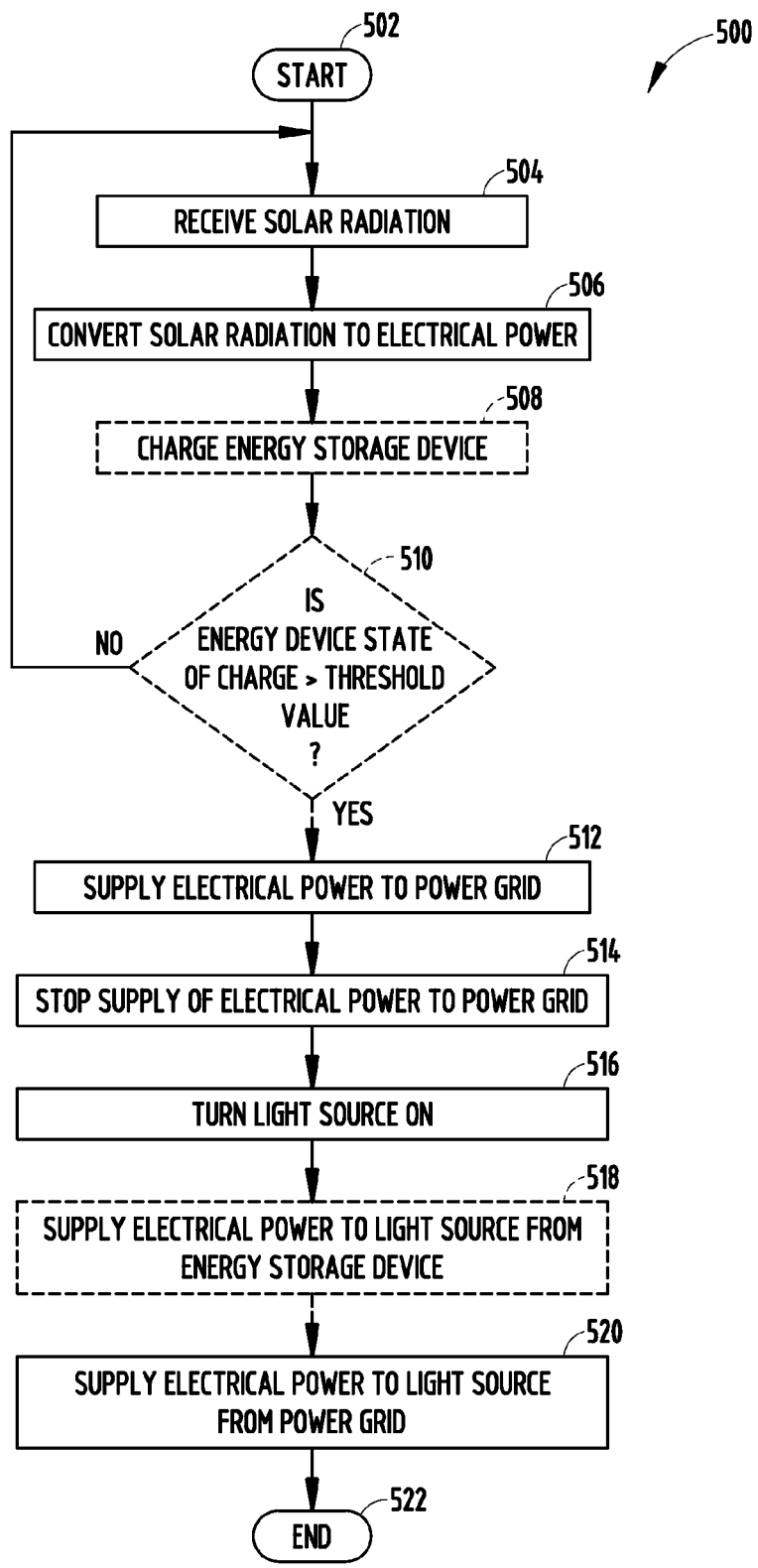
FIG. 19 is a flowchart illustrating a method of supplying electrical power to a power grid and illuminating a light source of a lighting device of a lighting device system, in accordance with one embodiment of the present invention.

In regards to both FIGS. 18 and 19, a method of supplying electrical power to a power grid 452 and illuminating a light source 104 of a lighting device 100 of a lighting device system 450 is generally shown in FIG. 19 at reference identifier 500. The method 500 starts at step 502, and proceeds to step 504, wherein solar radiation is received. Typically, the solar radiation (e.g., from the sun) is received by the solar panel 110. At step 506, the received solar radiation is converted to electrical power. According to one embodiment, the method 500 can proceed to step 512, wherein the electrical power is supplied to the power grid 452. Typically, an invertor 454 controls the supply of electrical power to the power grid 452 after the solar radiation received by the solar panel 110 is converted to electrical power.

According to an alternate embodiment, the method 500 proceeds from step 506 to step 508 (shown in phantom), wherein the energy storage device 128 is charged. Typically, the invertor 454 controls the supply of electrical power to the energy storage device 128. At decision step 510 (shown in phantom), it is determined if the state of charge of the energy storage device 128 is greater than a threshold value. If it is determined at decision step 510 that the state of charge of the energy storage device 128 is not greater than the threshold value, then the method 500 returns to step 508. However, if it is determined at decision step 510 that the state of charge of the energy storage device 128 is greater than the threshold value, then the method 500 proceeds to step 512.

After step 512, the method 500 proceeds to step 514, wherein the supply of electrical power to the power grid 452 is stopped, and at step 516, the light source 104 is turned on. Typically, the invertor 454 controls the supply of electrical power, such that the invertor 454 stops the supply of electrical power to the power grid 452, and controls the supply of electrical power to the light source 104, if the solar panel 110 continues to receive solar radiation. According to one embodiment, the method 500 proceeds to step 520, wherein the supply of electrical power to the light source 104 when the light source 104 is turned on is from the power grid 452. Typically, the solar panel 110 is receiving minimal solar radiation during step 520.

According to an alternate embodiment, the method 500 proceeds from step 516 to step 518 (shown in phantom), wherein the supply of electrical power to the light source 104 when the light source 104 is turned on is from the energy storage device 128. In such an embodiment, if the state of charge of the energy storage device 128 is below a threshold value (e.g., a zero percent (0%) state of charge), the light source 104 can be supplied electrical power from the power grid 452, at step 520. The method 500 then ends at step 522. Typically, the method 500 can result in the lighting system 100 having an approximately zero carbon footprint.

Advantageously, the lighting device 100 can be used in an environment where the lighting device 100 remains outdoors substantially all of the time, such as, but not limited to, a street light, a billboard light, an exit or road sign light, the like, or a combination. Thus, the energy storage device 128 can be charged during the daytime hours when the solar panel 110 receives solar radiation, and the energy storage device 128 can supply the stored electrical power to the light source 104 during the nighttime hours. Further, the controller 206 can control the supply of electrical power to the light source 104 to efficiently use the stored electrical power. Additionally or alternatively, the moveable connection between the attachment bracket 106 and the support bracket 108 allows the solar panel 110 to be positioned to optimize the amount of solar radiation received by the solar panel 110, and the light source 104 having an induction light bulb can increase efficiency of the stored electrical power, while enhancing the illumination pattern. It should be appreciated by those skilled in the art that additional or alternative advantages may be present from the lighting device 100, the lighting system 450, the method 300, and the method 500. It should further be appreciated by those skilled in the art that the above-described components can be connected in alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A lighting device configured to receive solar radiation from a solar radiation source, said lighting device comprising:
   a support structure comprising:
      an elongated member that extends substantially vertically from a base portion with respect to a normal operating position of the lighting device; and
      an arm extending outward from said elongated member;
   a light source connected to said arm;
      an attachment bracket having a groove on one side thereof and connected at the top of said elongated member and extending upward from said elongated member;
      a support bracket moveably connected within said groove to said attachment bracket, wherein said support bracket has an arched shape;
      a cover plate for covering said groove when said support bracket is engaged therein; and
      a solar panel attached at both ends to said support bracket, wherein an angle of said solar panel with respect to the solar radiation source is altered as a function of said moveable connection of said support bracket through said groove of said attachment bracket and said arched shape of said support bracket.

2. The lighting device of claim 1, wherein said solar panel is adapted to receive the solar radiation from the solar radiation source and supply electrical power to said light source as a function of the received solar radiation, such that said light source emits light.

3. The lighting device of claim 1, wherein said light source is an inductive light source.

4. The lighting device of claim 1, wherein said light source comprises:
   a top housing;
   a bottom housing configured to connect to said top housing, wherein said bottom housing defines an aperture;
   a substantially transparent substrate attached to said bottom housing, wherein said substantially transparent substrate occupies at least a portion of said aperture; and
   a light element substantially enclosed in said top and bottom housings, wherein light rays emitted from said light element propagates through said substantially transparent substrate.

5. The lighting device of claim 1, wherein an illumination pattern of light rays emitted from a light element is a function of at least one of said light element, a substantially transparent substrate, an aperture, and a filter.

6. The lighting device of claim 1 further comprising an energy storage device in electrical communication with said solar panel and said light source, wherein said energy storage device is configured to store electrical power supplied from said solar panel, and supply said electrical power to said light source.

7. The lighting system of claim 1 further comprising an invertor in electrical communication with said light source and said solar panel, wherein said invertor is configured to control a supply of said electrical power from said solar panel to a power grid.

8. The lighting device of claim 1, wherein said light source is a light emitting diode (LED).

9. The lighting device of claim 1 further comprising a photo-sensor configured to detect ambient light, such that said light source emits light when said detected ambient light is below a threshold value.

10. The lighting device of claim 9, wherein an intensity of said emitted light is altered as a function of said detected ambient light.

11. A solar powered lighting device configured to receive solar radiation from a solar radiation source, said solar powered lighting device comprising:
   a support structure comprising:
      an elongated member that extends substantially vertically from a base portion with respect to a normal operating position of the light device; and
      an arm extending outward from said elongated member;
   a light source connected to said arm, wherein said light source is an inductive light source;
   an energy storage device proximate said base portion of said elongated member and in electrical communication with said light source, said energy storage device configured to store electrical power and supply said electrical power to said light source;
   a photo-sensor configured to detect ambient light, such that said light source emits light when said detected ambient light is below a threshold value;
   an attachment bracket connected to said support structure, wherein said attachment bracket comprises at least one surface that defines a groove;
   a support bracket moveably connected to said attachment bracket, wherein said support bracket has an arched shape, such that said support bracket moves along said groove of said attachment bracket;
   a cover plate for covering said groove and facilitating removal of said support bracket from said attachment bracket when removed;
   a solar panel attached to both ends of said support bracket, wherein an angle of said solar panel with respect to the solar radiation source is altered as a function of said moveable connection of said support bracket to said attachment bracket and said arched shape of said support bracket; and
   an invertor in electrical communication with said light source and said solar panel, wherein said invertor is configured to control said supply of electrical power from said solar panel to a power grid.

12. The solar powered lighting device of claim 11, wherein said solar panel is adapted to receive the solar radiation from the solar radiation source and supply electrical power to said light source as a function of the received solar radiation, such that said light source emits light.

13. The solar powered lighting device of claim 11, wherein said light source comprises:
   a top housing;
   a bottom housing configured to connect to said top housing, wherein said bottom housing defines an aperture;
   a substantially transparent substrate attached to said bottom housing, wherein said substantially transparent substrate occupies at least a portion of said aperture; and
   a light element substantially enclosed in said top and bottom housings, wherein light emitted from said light element propagates through said substantially transparent substrate.

14. The solar powered lighting device of claim 11, wherein an illumination pattern of light rays emitted from a light element is a function of at least one of said light element and an aperture.

15. The solar powered lighting device of claim 11, wherein an intensity of said emitted light is altered as a function of said detected ambient light.

16. The solar powered lighting device of claim 11, wherein said light source is a light emitting diode (LED).

17. A lighting device system configured to receive solar radiation from a solar radiation source, said lighting device system comprising:
   a power grid; and
   at least one lighting device in electrical communication with said power grid, wherein said at least one lighting device comprises:
      a support structure;
      a light source connected to said support structure;
      an attachment bracket connected to a top section of said support structure having a groove on one side thereof;
      a support bracket moveably connected within said groove to said attachment bracket, wherein said support bracket has an arched shape, and said solar panel is attached to said support structure via said attachment bracket and said support bracket, such that an angle of said solar panel with respect to the solar radiation source is altered as a function of said moveable connection of said support bracket to said attachment bracket and said arched shape of said support bracket;
      a cover plate for covering said groove when said support bracket is engaged therein and facilitating removal of said support bracket when said cover plate is uncovered from said groove;
      a solar panel attached to said support bracket, wherein said solar panel is adapted to receive the solar radiation from the solar radiation source; and
      an invertor in electrical communication with said light source and said solar panel, wherein said invertor is configured to control a supply of electrical power from said solar panel to said power grid.

18. The lighting system of claim 17, wherein said power grid supplies electrical power to said light source when substantially minimal radiation is being received by said solar panel.

19. The lighting system of claim 17, wherein said light source is an inductive light source.

20. The lighting system of claim 17, wherein said light source is a light emitting diode (LED).

21. The lighting system of claim 17, wherein the lighting device further comprises at least one energy storage device, such that said invertor is configured to control the supply of electrical power from said solar panel to said at least one energy storage device when a state of charge of said at least one energy storage device is below a threshold value.

22. The lighting system of claim 21, wherein said power grid supplies electrical power to said light source when said energy storage device is below said threshold value, and when substantially minimum solar radiation is being received by said solar panel.

* * * * *